United States Patent
Katayama et al.

(10) Patent No.: US 8,442,028 B2
(45) Date of Patent: May 14, 2013

(54) PACKET COMMUNICATION SYSTEM, COMMUNICATION METHOD AND PROGRAM

(75) Inventors: Yasunao Katayama, Kanagawa (JP); Yasushi Negishi, Kanagawa (JP); Atsuya Okazaki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/951,118

(22) Filed: Nov. 22, 2010

(65) Prior Publication Data
US 2011/0128912 A1      Jun. 2, 2011

(30) Foreign Application Priority Data
Nov. 30, 2009   (JP) ................................. 2009-271997

(51) Int. Cl.
*H04J 3/06*   (2006.01)
(52) U.S. Cl.
USPC ........................................... 370/350; 370/515
(58) Field of Classification Search .......... 370/345–350, 370/498–545
See application file for complete search history.

(56) References Cited

U.S. PATENT DOCUMENTS 7,961,751 B2 *  6/2011  Fourcand ...................... 370/442
8,320,345 B2 * 11/2012  Doi et al. ...................... 370/338

FOREIGN PATENT DOCUMENTS

| JP | 2009-325069 A | 11/2006 |
| JP | 2008-061256 | 3/2008 |
| JP | 2009-225172 A | 10/2009 |
| JP | 2009-545248 A | 12/2009 |
| WO | WO-02/052748 A2 | 7/2002 |

* cited by examiner

*Primary Examiner* — Ricky Ngo
*Assistant Examiner* — Iqbal Zaidi
(74) *Attorney, Agent, or Firm* — Vazken Alexanian (57) ABSTRACT

A system including multiple nodes performing radio communication, wherein each node stores routing information, uses it to determine a transmission path, and performs cut-through transmission by transmitting and receiving packets to and from a node on the determined path through transmission and reception radio waves given a directivity by controlling their phases. In the system, time synchronization and transmission and reception of packet communication records are performed during a certain time period by carrying out the cut-through transmission while controlling phases of the radio waves so that all of the nodes form one or more closed loops. The node transmits and receives packets in accordance with routing information and a time frame assigned to each of the nodes as a time when each node is allowed to transmit and receive a packet, updates the routing information, and shares it with each node.

21 Claims, 10 Drawing Sheets

| SENDER \ RECEIVER | A | B | C | D | E | F |
|---|---|---|---|---|---|---|
| A | - | 100 | 0 | 0 | 0 | 100 |
| B | 100 | - | 100 | 0 | 100 | 0 |
| C | 0 | 100 | - | 100 | 0 | 100 |
| D | 0 | 0 | 100 | - | 100 | 0 |
| E | 0 | 100 | 0 | 100 | - | 100 |
| F | 100 | 0 | 100 | 0 | 100 | - |

FIG. 9

| SENDER \ RECEIVER | A | B | C | D | E | F |
|---|---|---|---|---|---|---|
| A | - | 10 | 0 | 20 | 30 | 0 |
| B | 30 | - | 80 | 0 | 10 | 0 |
| C | 50 | 0 | - | 0 | 20 | 10 |
| D | 0 | 0 | 10 | - | 0 | 10 |
| E | 0 | 10 | 0 | 20 | - | 10 |
| F | 10 | 80 | 0 | 0 | 0 | - |

FIG. 10

| SENDER \ RECEIVER | A | B | C | D | E | F |
|---|---|---|---|---|---|---|
| A | - | B | B | B | B | F |
| B | A | - | C | E | E | C |
| C | B | B | - | D | D | F |
| D | E | E | C | - | E | C |
| E | B | B | D | D | - | F |
| F | A | A | C | C | E | - |

FIG. 11

| SENDER \ RECEIVER | A | B | C | D | E | F |
|---|---|---|---|---|---|---|
| 0 | - | - | B | - | - | - |
| 1 | B | - | B | - | - | - |
| 2 | B | - | B | - | - | - |
| 3 | - | - | B | - | - | - |
| 4 | - | - | - | - | - | - |
| 5 | - | - | - | - | - | - |
| 6 | - | - | - | - | - | - |
| 7 | - | - | - | - | - | - |

PACKET COMMUNICATION SYSTEM, COMMUNICATION METHOD AND PROGRAM

CROSS REFERENCE TO RELATED APPLICATION

This application claims priority under 35 U.S.C. 119 from Japanese Application 2009-271997, filed Nov. 30, 2009, the entire contents of which are incorporated herein by reference.

BACKGROUND OF THE INVENTION

1. Field of the Invention

The present invention relates to a packet communication system that uses beam forming and enables transmission and reception of multiple packets exclusively in time and space, and relates to a communication method for the packet communication system, and a program readable by the packet communication system for executing the method.

2. Description of Related Art

In recent years, use of beam forming has gradually increased in radio communication systems using radio waves. Beam forming is a technique for reducing radio wave interference between base stations and terminals so that the radio wave can be transmitted for a longer distance (for example, see International Publication No. WO/02/052748). Use of this technique enables propagation of electromagnetic wave energy with a certain directivity, so that transmission distance, space utilization efficiency, power efficiency and the like can be enhanced.

Beam forming is achieved by combining two techniques: null steering and beam steering. Null steering is a technique for preventing a base station from transmitting and receiving a radio wave in and from a direction where another base station interfering with the first base station exists. Beam steering is a technique for intensely transmitting a radio wave of a base station in a specific direction.

In null steering, an antenna including multiple antenna elements arranged in a certain order is used to give a certain directivity to a radio wave, so that radio waves can be transmitted and received without interfering with those transmitted from other base stations or terminals. Meanwhile, in beam steering, a radio wave can be transmitted intensely by varying the phase and power of each of the signals transmitted from multiple antenna elements.

However, in a system where communications are made by use of beam forming, a problem exists of how to perform efficient synchronization and broadcasting among individual transceivers.

Since data is exchanged by synchronizing a data signal and a local clock signal, transceivers which are to exchange the data need to operate at the same clock speed. In a case of transmitting a packet to a destination address through multiple transceivers, all of the transceivers need to operate at the same clock speed. To make all of the transceivers operate at the same clock, synchronization signals are transmitted to the transceivers, so that each of the transceivers may use the synchronization signal to synchronize with the local clock signal for reading data. Generally, synchronization signals can be transmitted efficiently by broadcasting. However, in communication by use of beam forming, synchronization signals cannot be transmitted efficiently because radio waves are given a certain directivity and are transmitted only to specific transceivers.

Moreover, each transceiver transmits a broadcast signal to an unspecified number of transceivers, acquires address information, routing information, channel information and the like of communicable transceivers by receiving responses from the transceivers, and stores the acquired information. The address information includes a MAC address or an IP address, the routing information includes a routing table recording optimal routes to various destinations, and the channel information includes a frequency band. Each transceiver is capable of periodically transmitting the broadcast signal to acquire information that the transceiver does not store therein, and use the new information to update information stored therein. However, in communication by use of beam forming, broadcast signals cannot be transmitted efficiently as similar to the above case.

Against this background, there is a method in which a master controller is used to schedule all communications with all devices, and distribute synchronization signals and broadcast signals to individual devices (for example, see Japanese Patent Application Publication No. 2008-061256). However, with this method, if the number of devices increases, overhead is increased proportionally to the number of devices. Moreover, every device needs to communicate with the master controller, and thus arrangement of the devices is restricted.

There is also a method for stopping the beam forming during synchronization and broadcasting. In this method, the synchronization and broadcasting can be performed efficiently since radio waves do not have directivity. However, the transmission distance of a signal is shortened in this method, or the data rate needs to be lowered in order to keep the same transmission distance, as in the case of using the beam forming technique.

BRIEF SUMMARY OF THE INVENTION

To overcome these deficiencies, the present invention provides a packet communication system for transferring a packet to a destination address, including: a plurality of nodes performing radio communication, wherein each of the nodes: stores routing information for determining a transmission path of the packet, transmits and receives the packets to a transfer destination node and from a transfer source node on a transmission path determined by use of the routing information, through transmission and reception radio waves each of which is given a certain directivity by controlling a phase of the radio wave, and has a function of performing a cut-through transmission in which transfer of the packet to the transfer destination node is initiated after reading of a destination address included in the packet and before reception of the packet is completed, and wherein the packet communication system: performs time synchronization and transmission and reception of packet communication records during a certain time period by carrying out the cut-through transmission, while controlling the phases of the transmission and reception radio waves so that all of the nodes form one or more closed loops, and transfers the packet to the destination address at a time other than the certain time period in accordance with the routing information and a time frame assigned to each of the nodes as a time when each node is allowed to transmit and receive a packet, updates the routing information held by each node on the basis of the packet communication records, and shares the updated routing information among the nodes after the time synchronization.

In another aspect, the present invention provides a communication method in a packet communication system, including a plurality of nodes performing radio communication, for transferring a packet to a destination address, the communication method including: storing, in each of the nodes, routing information for determining a transmission path of the packet; transmitting and receiving the packets, by each of the nodes, to a transfer destination node and from a transfer source node on a transmission path determined by use of the routing information, through transmission and reception radio waves each of which is given a certain directivity by controlling a phase of the radio wave; performing, by each of the nodes, a cut-through transmission in which transfer of the packet to the transfer destination node is initiated after reading of a destination address included in the packet and before reception of the packet is completed; performing time synchronization and transmission and reception of packet communication records during a certain time period by carrying out the cut-through transmission, while controlling the phases of the transmission and reception radio waves so that all of the nodes form one or more closed loops; transferring the packet to the destination address at a time other than the certain time period in accordance with the routing information and a time frame assigned to each of the nodes as a time when each node is allowed to transmit and receive a packet; updating the routing information held by each node on the basis of the packet communication records; and sharing the updated routing information among the nodes after the time synchronization.

In yet another aspect, the present invention provides a computer program product for executing a communication method for transferring a packet to a destination address, the program being readable by a packet communication system including a plurality of nodes performing radio communication, the computer program product including a computer readable storage medium having computer readable program code embodied therewith, the computer readable program code including computer readable program code configured to: store in each of the nodes routing information for determining a transmission path of a packet; transmit and receive packets to and from a transfer destination and a transfer source node on the transmission path determined by use of the routing information, the transmission and reception being performed by controlling phases of transmission and reception radio waves and giving the radio waves a certain directivity; perform cut-through transmission in each of the nodes in which transfer of the packet to the transfer destination node is initiated after reading a destination address included in the packet and before reception of the packet is completed; perform time synchronization and transmission and reception of packet communication records during a certain time period by carrying out the cut-through transmission, while controlling the phases of the transmission and reception radio waves so that all of the nodes form one or more closed loops; and transfer the packet to the destination address at a time other than the certain time period in accordance with the routing information and a time frame assigned to each of the nodes as a time when each node is allowed to transmit and receive a packet, update the routing information held by each node on the basis of the packet communication records and share the updated routing information among the nodes after the time synchronization.

DETAILED DESCRIPTION OF THE PREFERRED EMBODIMENTS

An embodiment of the invention provides a system and a method which enable efficient synchronization and broadcasting without using a master controller in a system where communication is made by use of beam forming, and which also enable efficient transmission and reception of multiple packets exclusively in time and space.

Figure 1:
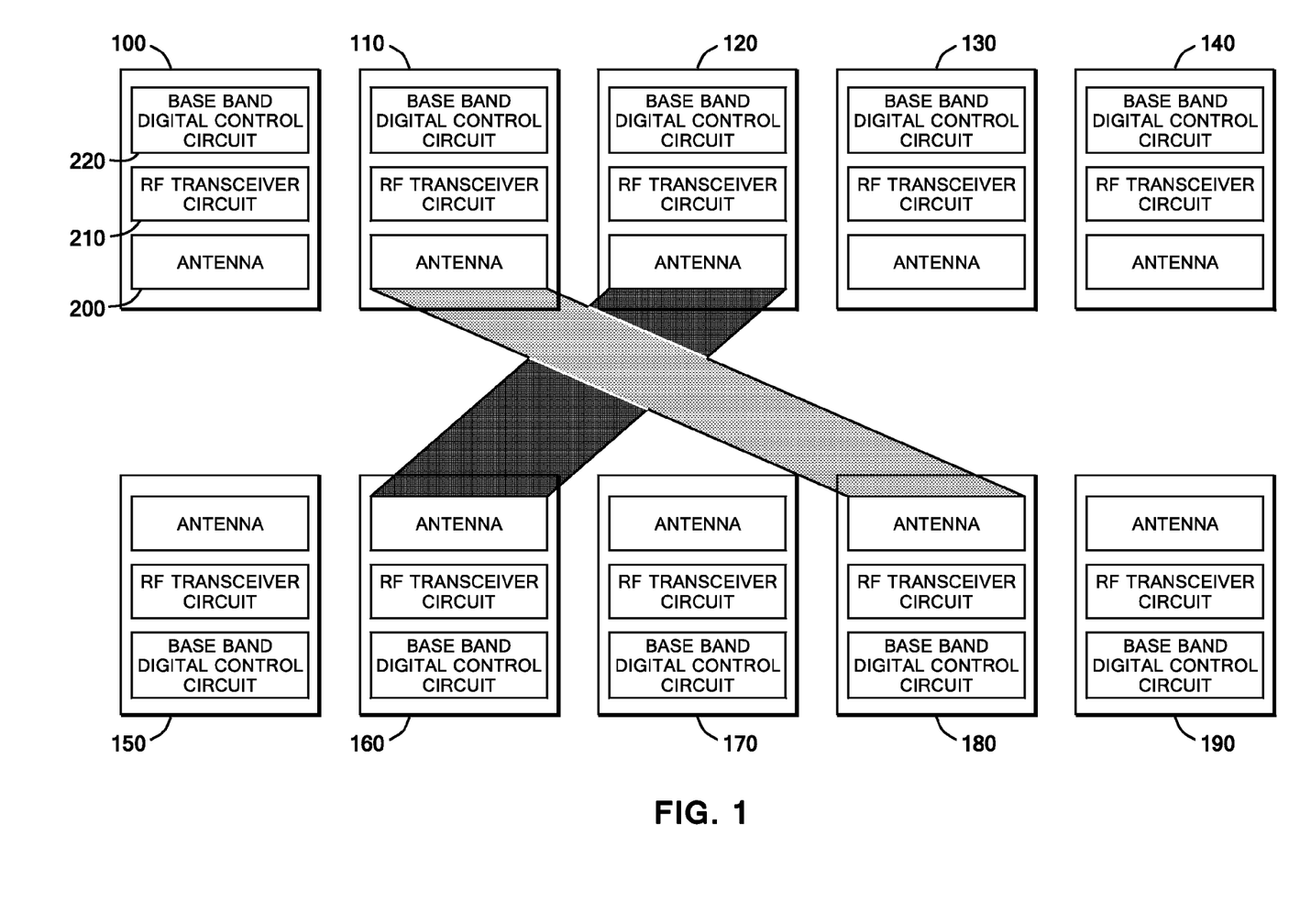
FIG. 1 is a diagram showing a configuration example of a packet communication system configured of multiple nodes.

Although the invention will be described below in relation to a concrete embodiment shown in the drawings, the invention is not limited to the following embodiment. FIG. 1 is a diagram exemplifying a configuration of a packet communication system of an embodiment of the invention. This packet communication system is configured of multiple radio transceivers which are referred to as nodes 100 to 190. Each of nodes 100 to 190 is configured to include an antenna 200, an RF transceiver circuit 210 and a base band digital control circuit 220. The antenna 200 is configured of multiple antenna elements arranged in a certain order. The RF transceiver circuit 210 serves as a phase control means capable of controlling phases of radio waves which specify the direction of transmission and reception radio waves of each antenna element. The base band digital control circuit 220 serves as a transmission and reception means configured to perform processing, such as packet transmission and reception.

The nodes 100 to 190 are located away from each other, and are capable of performing packet communication among one another by use of radio waves. The antenna 200 is a device which transmits electrical energy as a radio wave, and receives a radio wave in the air to convert it into electrical energy. A simple example of the antenna 200 is that in which multiple rod antenna elements are arranged in a certain order.

Figure 2:
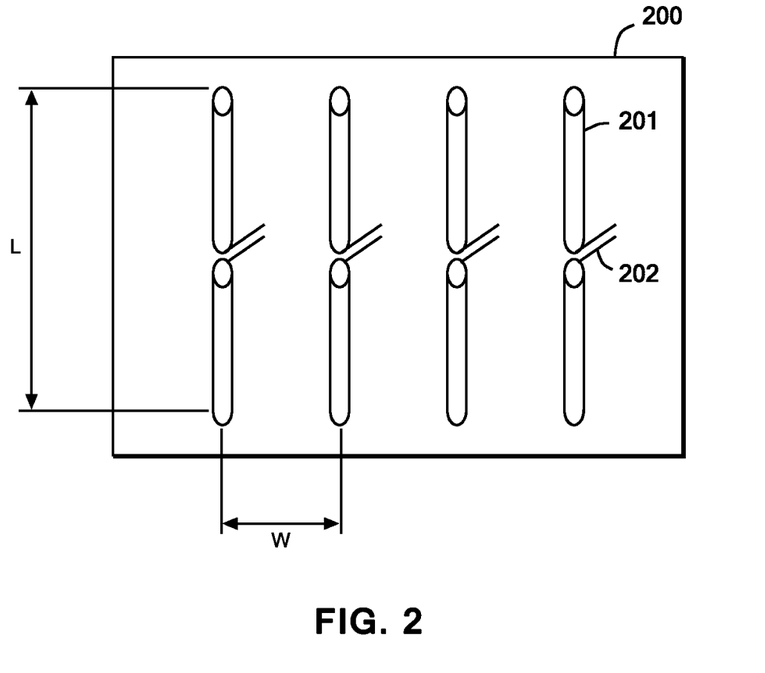
FIG. 2 is a diagram showing an example of an antenna configured of multiple antenna elements included in a node.

For example, as shown in FIG. 2, the antenna 200 can be configured so that two of rod antenna elements 201 are aligned vertically, the total length L thereof is set to be equal to a half-wavelength of a radio wave, and pairs of the antenna elements 201 are arranged at a certain pitch such as a pitch W which is approximately a quarter of a wavelength to a single wavelength, for example. A feeder line 202 is connected to each of the antenna elements 201, so that electric power can be transmitted through the feeder line 202.

Referring back to FIG. 1, the RF transceiver circuit 210 is connected to the feeder lines 202 and controls the phases that specify the direction of radio waves transmitted and received by each antenna element 201. Specifically, since the antenna 200 is configured of multiple antenna elements 201, the RF transceiver circuit 210 converts a destination address included in a packet into a phase difference of a radio wave which should be applied to each of the antenna elements 201 included in the transfer destination node. While the RF transceiver circuit 210 is capable of transmitting a radio wave in a specific direction by controlling the phase of the radio wave, the antenna 200 is configured of multiple antenna elements 201 which are located at different positions in the antenna 200. Hence, in order for appropriate reception in each antenna element 201, the direction of a radio wave that should be transmitted to each antenna element 201 is converted into a phase difference relative to a specific direction. By performing such phase control, a certain directivity is given to a radio wave, whereby the radio wave is transmitted in a specific direction and thus beam forming can be achieved.

The base band digital control circuit 220 performs processing such as packet transmission and reception. The base band digital control circuit 220 can be a large-scale integration (LSI) which implements functions of a media access control (MAC) layer and a physical (PHY) layer, and on which a digital-analogue converter (DAC), an analogue-digital converter (ADC), a CPU, a static RAM (SRAM) and the like are mounted.

The base band digital control circuit 220 is connected with an unillustrated host CPU and exchanges transmission and reception data with the host CPU. The base band digital control circuit 220 has a packet assembly/disassembly (PAD) mounted thereon, and is capable of converting data received from the host CPU into a packet, storing it in a storage device such as an SRAM, and transmitting the packet when a relay transmission path is available. The base band digital control circuit 220 having a PAD mounted thereon is also capable of storing a received packet in a storage device, converting the stored packet into data and transmitting the data to the host CPU. Note that the host CPU sets a destination address and performs processing such as transmission of data to the base band digital control circuit 220.

As shown in FIG. 1, the nodes 100 to 190 are located away from each other. In one embodiment, for example, if the nodes 100 to 140 on the upper side of FIG. 1 are caused to function as transmitters, the nodes 150 to 190 on the lower side are caused to function as receivers, whereby node pairs are formed. Otherwise, each of the nodes 100 to 190 may have a transmission antenna and a reception antenna so that each node may perform both transmission and reception.

Generally, at a time of low congestion when only few radio waves are transmitted and received, packets transmitted by the radio waves are not likely to collide with each other, and performance is minimally deteriorated by collisions. However, it becomes important to avoid a collision when the number of packets increases. Here, a collision occurs when two or more nodes simultaneously initiate transmission of a packet to the same node. When packets collide, the two or more packets overlap each other, and the packets become unreadable. At a time of high congestion when many radio waves are transmitted and received, the possibility of a collision increases, and system performance is greatly deteriorated.

However, the packet communication system of the embodiment of the invention avoids a collision and achieves efficient communication by enabling temporally and spatially exclusive control, that is, by enabling communication exclusively in time and space. Specific control operations will be described below in detail.

Nodes communicate by exchanging packets. A packet includes a destination address. In order to transmit the packet to the destination address, the base band digital control circuit 220 refers to a routing table, which is routing information for determining a transfer route of the packet, and determines the node through which to transmit the packet to the destination. Then, the RF transceiver circuit 210 controls the phase to be applied to the antenna 200 of the first node, and the base band digital control circuit 220 transmits the packet by a radio wave. This radio wave is controlled to have a certain directivity to allow spatially exclusive communication. Note that the routing table is held by each of the nodes 100 to 190, and is stored in a storage device such as an SRAM.

When the first node receives the packet, the node reads the destination address, refers to the routing table, determines the next node and transfers the packet to the next node. In this respect, each of the nodes 100 to 190 holds address information of communicable nodes and channel information used in communication, and uses the address information and the channel information to transfer the packet. Hence, the packet can be transmitted to the destination by being transferred with reference to the routing table.

If two nodes receive packets at the same time and transmit the packets to the same node, the aforementioned collision occurs. For this reason, adjustment needs to be made to vary the transmission timings thereof. The adjustment is made by transmitting a packet communication record to other nodes, such as an inter-node transfer rate and an amount of previously transferred data, and acquiring packet communication records from other nodes to share information. Then, routing is performed to avoid a collision on the basis of predictions made from the communication records.

To adjust the transmission timings of packets, time synchronization needs to be performed for each node. Accordingly, each node transmits a broadcast signal for sharing information and a synchronization signal to other nodes, and performs time synchronization as well as acquires information from other nodes.

In communication using beam forming, a radio wave is given a certain directivity, whereby the transmission distance thereof is made longer with the same amount of electric power. Since other space can be used for transmission of other radio waves, space utilization efficiency can be improved. This, in turn allows transmission with a small amount of electric power which leads to improvement in power efficiency. However, each node needs to transmit signals to other nodes by use of radio waves in different directions to perform time synchronization and share information among the nodes, which lowers efficiency and requires a considerable amount of time in the time synchronization and information sharing.

Hence, in the present embodiment of the invention, all the nodes 100 to 190 control phases of radio waves in a predetermined time period so as to form a closed loop (closed transmission path), and performs the time synchronization and information sharing efficiently by use of cut-through transmission. As for the predetermined time period, a period in which time synchronization and information sharing are performed, the routing table is updated, and a later-described assignment table is generated can be measured and set as the predetermined time period.

The closed loop can be formed by causing each of the nodes 100 to 190 to control the phase to specify the direction of a radio wave to be transmitted. Specifically, on the assumption that each node is configured to have a transmission antenna and a reception antenna, radio waves are transmitted in the order of the nodes 100, 150, 110, 170, 130, 190, 140, 180, 120, 160 and 100 as indicated by the arrows in FIG. 3. To form the closed loop, the node 100, for example, controls a phase to transmit a radio wave to the node 150, and controls a phase to receive a radio wave from the node 160. The closed loop also can be formed in accordance with closed loop information set in advance.

The synchronization signal and the broadcast signal can be transmitted as packets. A packet is obtained by dividing information into small data pieces, and a destination address, a source address, and control information such as a packet type and length are added to a part of each of the small data pieces.

More specifically, a packet includes at its beginning a preamble formed of a bit string, which is transmitted prior to the data to announce an initiation of communication. The preamble is followed by an SOF (Start of Frame) indicating the beginning of the packet, a destination address, a source address, a type, length and the like of the packet, and then data. Generally, when a node starts reception of a packet, the packet is transmitted to the base band digital control circuit 220 which performs processing of the transmission and reception of packets. Normally, the node does not transfer the packet to the next node determined by routing until it completes reception of the data. This configuration requires a long time for transmitting the packet to the destination address.

Thus, the present embodiment of the invention employs cut-through transmission, in which each node performs, before the completion of the reception of data, routing in accordance with the destination address included in the packet; then it sequentially transfers data received and accumulated in a buffer from its beginning to the next node determined by the routing. Hence, the time synchronization and information sharing can be performed efficiently by employing the cut-through transmission. In order to do this, upon reading the destination address in the packet, the RF transceiver circuit 210 converts, before completion of reception of the packet, the destination address into a phase difference of a radio wave to be applied to each antenna element included in the destination node.

Figure 3:
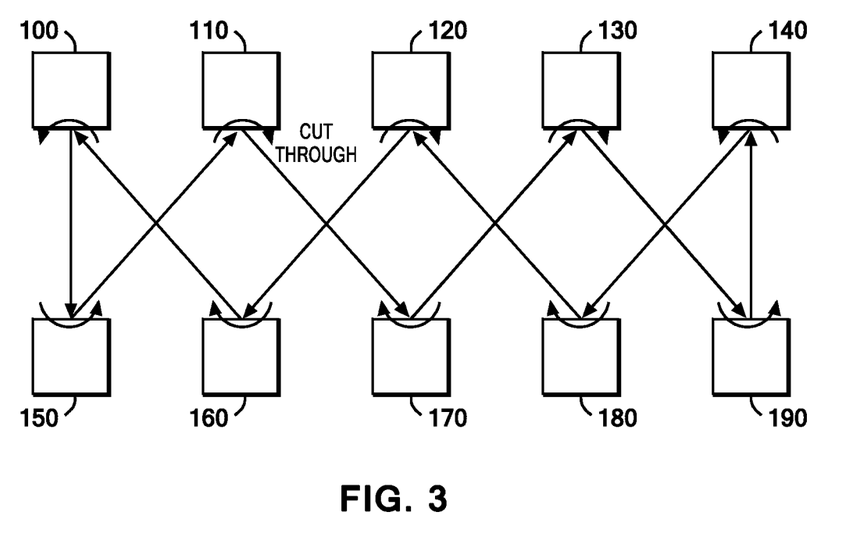
FIG. 3 is a diagram showing a state in which a closed loop is formed in the packet communication system.

A detailed description will be given of a method for efficiently performing time synchronization and information sharing, with reference to a flowchart shown in FIG. 7 and a system configuration diagram including six nodes shown in FIGS. 4 to 6, although the system configuration is different from that shown in FIGS. 1 and 3. For ease of understanding, in FIGS. 4 to 6, six nodes 100 to 150 are arranged to form a regular hexagon. Here, for example, the node 100 controls phases to transmit and receive radio waves so as to transmit a packet to the node 110 and receive a packet from the node 150.

For example, any one of the nodes 100 to 150 initiates time synchronization and information sharing by performing, at predetermined intervals, broadcasting for the time synchronization and information sharing by transmitting a packet including a preamble, an SOF, a destination address, a source address, a type, length and the like of the packet, data and so forth. A broadcast address is used as the destination address for the packet to transmit data to all of the nodes. Note that since it is difficult to carry out the time synchronization and information sharing when a node is busy, the processing therefore is not limited to being performed at predetermined regular intervals, but can be performed at irregular intervals.

For example, the node 100 determines whether a predetermined time has passed since the last time the time synchronization and information sharing have been initiated. If so, the node 100 initiates time synchronization and information sharing by controlling a phase of a radio wave and transmitting the aforementioned packet to the node 110 which is routed in advance. Upon receipt of the packet, the node 110 performs synchronization by use of the preamble, detects the beginning of the packet by the SOF, and from the type of the packet and because the broadcast address is the destination address is notified that the time synchronization and information sharing are to be performed. Accordingly, the node 110 generates a packet by including information held therein as data and using the broadcast address as the destination address. Then, the node 110 controls a phase of a radio wave and transmits the packet to the node 120 which is routed in advance. At this time, the node 110 performs cut-through transmission and transmits the packet to the node 120 before receiving the entire packet from the node 100.

Thus, each of the nodes 100 to 150 controls a phase of a radio wave toward a specific destination, transmits a packet including a preamble, an SOF, a destination address, a source address, a type and length of the packet, and a packet communication record as data, and receives a radio wave from a specific source. It should be noted that only preambles, SOFs and data are shown in FIGS. 4 to 6. Each of the nodes 100 to 150 performs synchronization by use of the preamble, receives a packet from a specific source and generates a packet to transmit to a destination node by adding data acquired from the source node, which is included in the packet, to data of its own.

Figure 5:
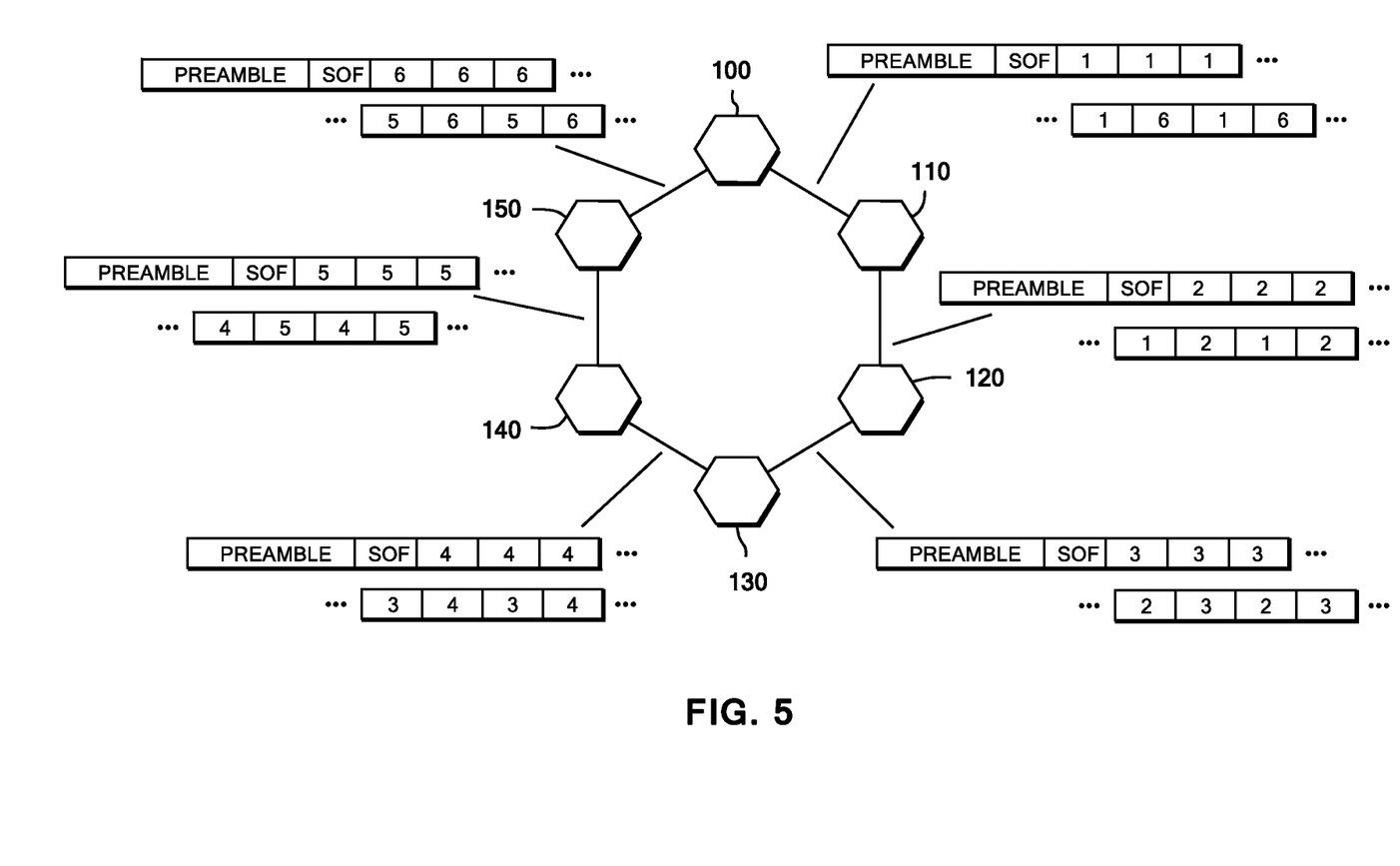
FIG. 5 is a diagram exemplifying the state in which the time synchronization and the broadcasting are performed.

Packets shown in FIG. 5 are packets to be transmitted next, and in a packet to be transmitted from the node 100 to the node 110, for example, data 6 acquired from the node 150 is added to data 1 of the node 100. Hence, by repeating the processing of generating a packet by adding acquired data in this manner and of transmitting the resultant packet, time synchronization can be performed among all of the nodes 100 to 150, and each of the nodes 100 to 150 can acquire all of the pieces of data 1 to 6 of the respective nodes 100 to 150 as shown in FIG. 6.

Figure 7:
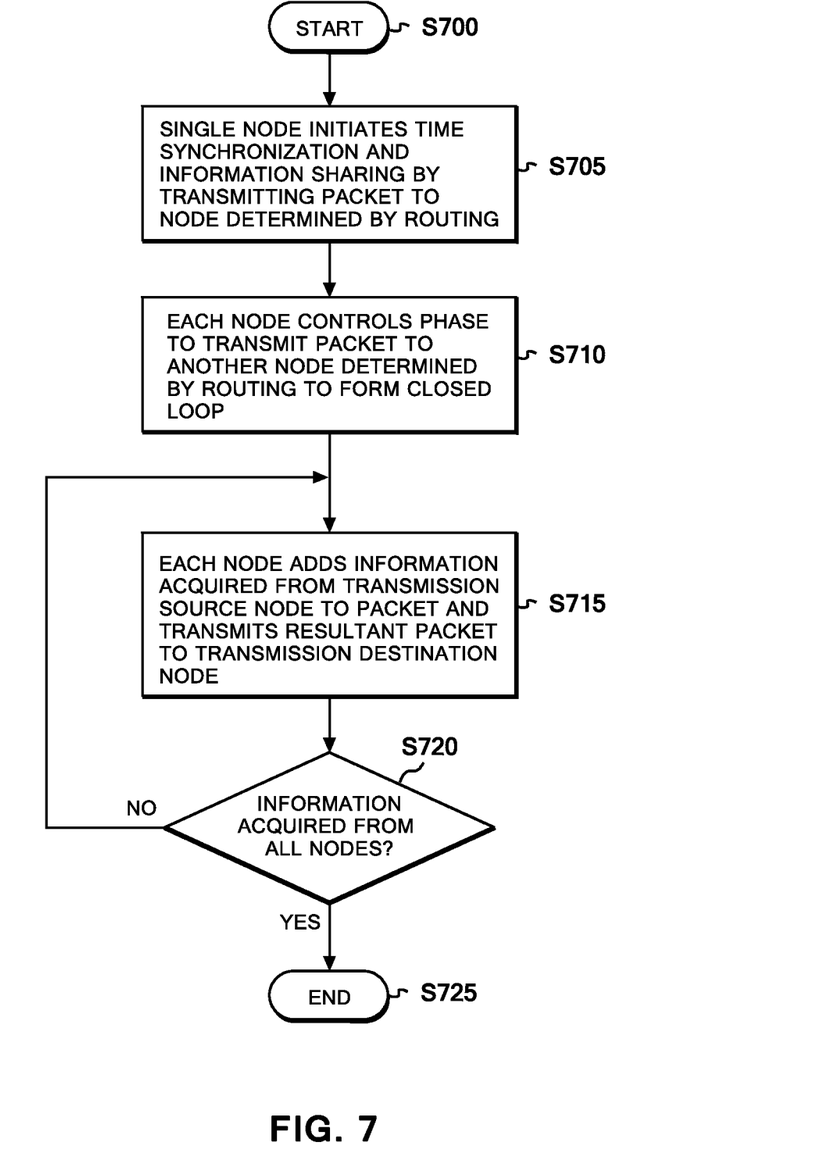
FIG. 7 is a flowchart showing a flow of time synchronization and broadcasting.

Specifically, as shown in FIG. 7, in the processing starting from step S700, any predetermined node such as the node 100 generates a packet by including its packet communication record as data and setting a broadcast address as a destination address, controls a phase of a radio wave to transmit the packet to the node 110 routed in advance, and thereby initiates time synchronization and information sharing in step S705. Then, in step S710, a closed loop is formed by causing a packet to be transmitted sequentially among the nodes 100 to 150 in an order determined in advance by routing such as from the node 110 to 120, and then from the node 120 to 130. Here, each node controls a phase of a radio wave to communicate with a specific node, and also receives a radio wave from a specific source. The packet includes a preamble, an SOF, a destination address, a source address, a type and length of the packet, and a packet communication record as data.

In addition, in another embodiment, a more efficient cut-through transmission can be performed in the following manner. Specifically, after the processing starts in step S700, the node 110, for example, initiates transmission of its own information to the node 120 being the next stage which is defined in advance by routing in the closed loop, before receiving a packet from the node 100 being the previous stage. Then, upon receipt of data from the node 100 being the previous stage, the node 110 adds, without including a preamble, the data of the packet received from the node 100 being the previous stage to the packet that the node 110 is currently transmitting to the node 120 being the next stage. Employment of such a scheme reduces time required for synchronization of preambles and time required for sharing information among all nodes in the closed loop, since all the nodes can initiate transmission at the same time.

In step S715, each of the nodes 100 to 150 generates a packet by adding information acquired from a source to its own information, and transmits the packet to a destination node. In step S720, the node 100 which has initiated the time synchronization and information sharing determines whether it has acquired information from all of the nodes 100 to 150. If not, the processing returns to step S715. On the other hand, if information is acquired from all the nodes 100 to 150, the processing proceeds to step S725, and the time synchronization and information sharing are terminated.

Thereafter, the node 100 updates a routing table held therein on the basis of acquired data and transmits the routing table to the nodes 110 to 150, whereby each of the nodes 110 to 150 may update a routing table held therein.

Although a routing table can be formed manually and statically in a small network, in a general network, a routing table is formed dynamically by use of a routing protocol and a routing algorithm. The routing protocol is used to perform broadcasting so that each of the nodes 100 to 150 may acquire a packet communication record from the other nodes as information thereof. The routing algorithm is used at the time of generating a routing table based on the acquired information. Known techniques such as the distance vector algorithm (DVA), the link state algorithm (LSA) and the simplex method can be used as the routing algorithm.

In the DVA, a numeric value called a cost is assigned to each pair of nodes. In the beginning, each node only holds information indicating which are the nearest nodes and costs between itself and the nearest nodes. Then, after periodically exchanging information among the nodes, pieces of information among other nodes are collected, which are formed into a routing table. If data forwarded from a neighboring node includes information which is not included in the routing table held by the node, and which indicates a lower cost to the same destination, the node updates the table by use of this piece of information.

In the LSA, each of the nodes broadcasts nodes connected thereto. The node generates a map based on the broadcasted data, determines the shortest paths to the other nodes in accordance with the generated map, and expresses the whole network in a tree structure. Unregistered nodes are added to the tree structure so as to be reachable at the lowest cost. A routing table is generated on the basis of the thus generated tree structure.

Routing can be formulated as a linear programming problem. An optimal solution for a given linear programming problem can be obtained with a relatively small amount of calculation by use of the simplex method. In formulating the linear programming problem, direct transfer rates and predicted data transfer amounts among nodes are given as inputs, and minimization of the upper limit of utilization rate of each communication path is given as an objective function. Further, constraints are given that a total of amount of data transferred at the start point, the end point, and relay nodes coincide with a given input; and that the utilization rate of each communication path is not higher than the upper limit.

Note that a cost is obtained in accordance with a transfer rate, a data transfer amount, a delay, the number of hops, a cost of a path, a load, an MTU, reliability, a communication cost and the like.

In this embodiment, processing for the time synchronization and information sharing are efficiently performed by employing cut-through transmission to transmit packets to the next node. Arbitrary transmission packets are transmitted and received after the time synchronization, and broadcasting is thus performed and the routing table is updated.

The arbitrary packet is routed in accordance with a destination address and the updated routing table, and is transmitted to the destination address via the nodes determined in the routing.

At this time, the timing at which each node transmits the arbitrary packet needs to be considered in order to avoid a collision. Hence, the time period for using a band is equally divided into time frames called slots, and a node is assigned a communication opportunity for each slot. Then, the slots collectively form a period called a frame, and an assignment table is formed so that all of the nodes transmit packets periodically. The table is generated on the basis of information acquired from each node, and the transmission timings can be determined by use of this assignment table.

Since a collision is not likely to occur in a slot whose utilization rate is not higher than a certain value, collisions can be allowed in such a slot by not assigning a communication opportunity for the slot to any specific node. A slot for which no communication opportunity is assigned is usable by any node at any time, and thus wait time before using the slot can be reduced, while throughput is degraded due to occurrence of collisions. To what extent to allow collisions needs to be determined in consideration of the trade-off between wait time and throughput.

Figure 4:
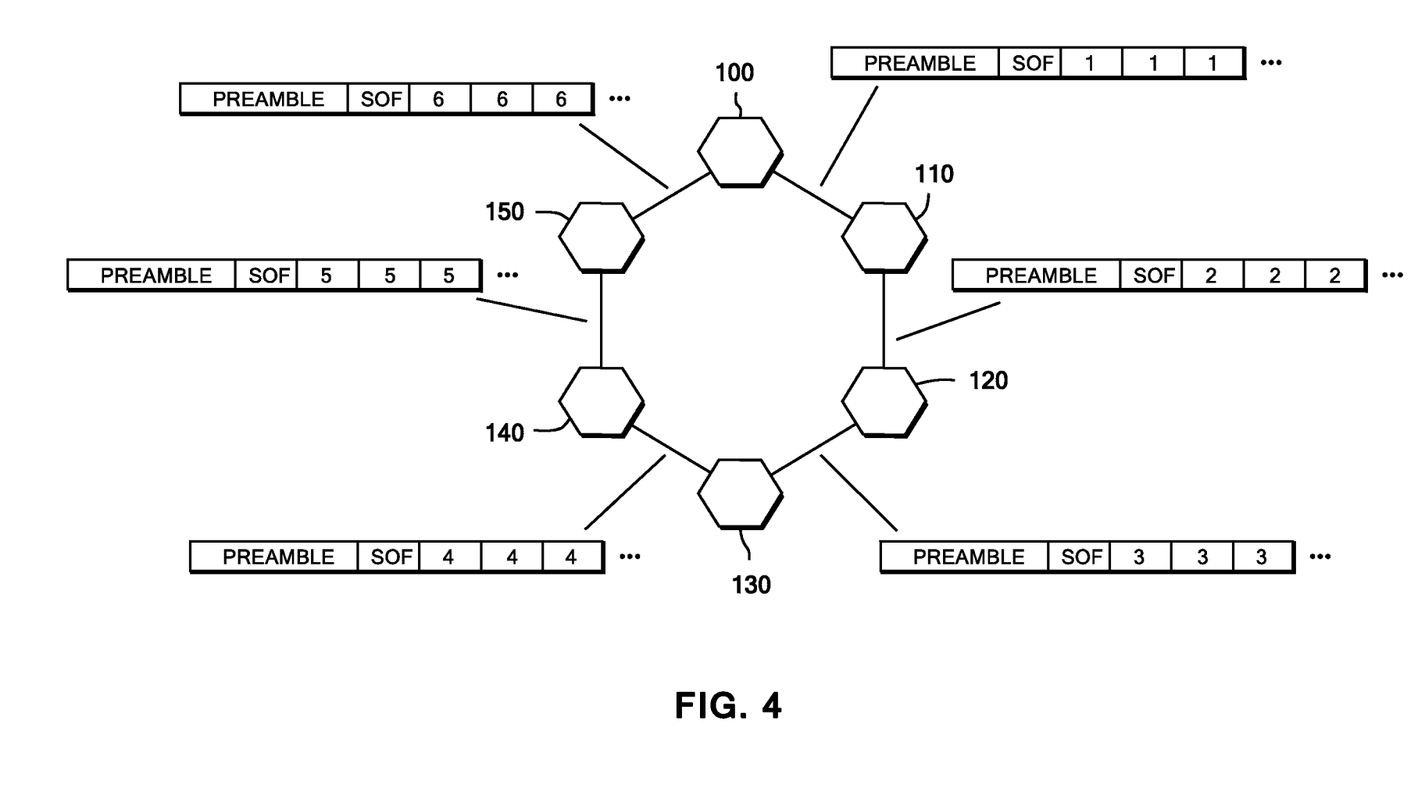
FIG. 4 is a diagram exemplifying a state in which time synchronization and broadcasting are performed.
Figure 6:
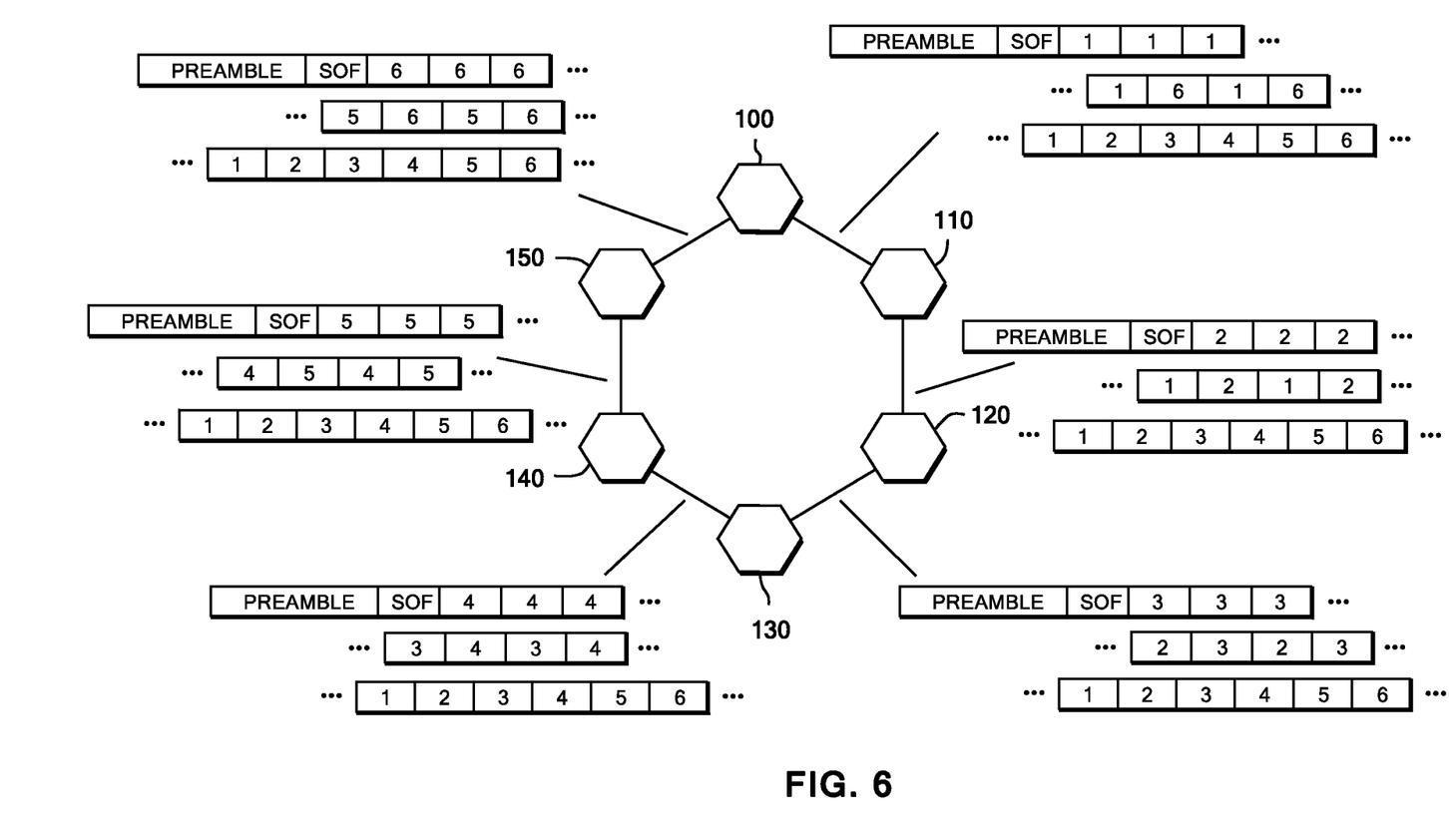
FIG. 6 is a diagram exemplifying the state in which the time synchronization and the broadcasting are performed.
Figure 8:
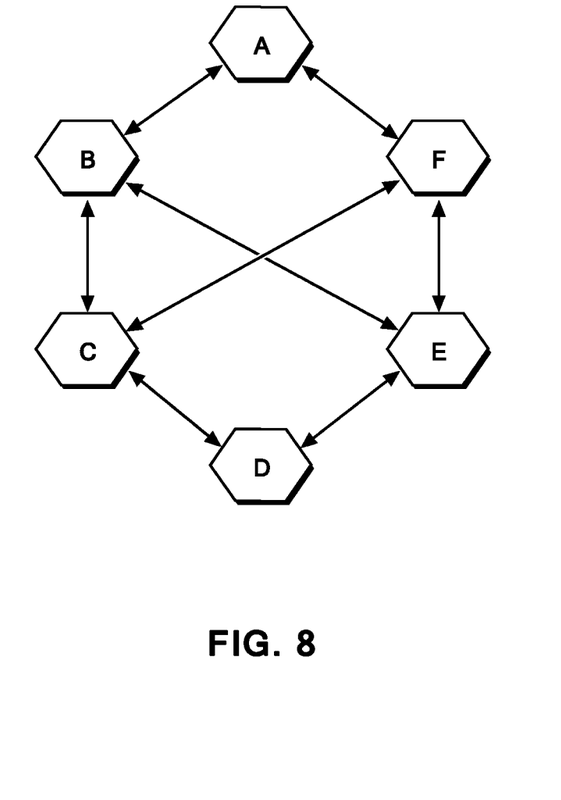
FIG. 8 is a diagram exemplifying an arrangement of multiple nodes communicating with each other.

FIG. 8 exemplifies a system configured of six nodes as in the system shown in FIGS. 4 to 6, and each node has a certain directivity which allows communication with specific nodes. Node A is communicable with nodes B and F, node B is communicable with nodes A, C and E, node C is communicable with nodes B, D and F, node D is communicable with nodes C and E, node E is communicable with nodes B, D and F, and node F is communicable with nodes A, C and E.

Figure 9:
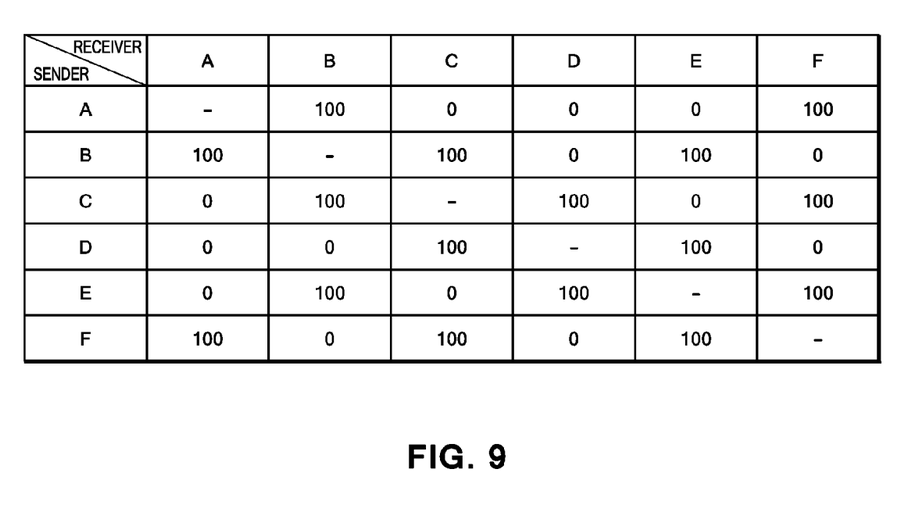
FIG. 9 is a table exemplifying a throughput table in which inter-node data transfer rates are recorded.

The directivity is determined in accordance with a throughput table shown in FIG. 9 which indicates inter-node transfer rates. The throughput table is generated by inputting transfer rates obtained from communication tests which are performed at the time of locating the nodes A to F. In the table, "Sender" indicates the transmitting side and "Receiver" indicates the receiving side. In FIG. 9, all of the transfer rates between communicable nodes are set to "100." Each of the set values of the transfer rates inputted to the throughput table can be changed as appropriate by measuring the transfer rate in actual communication. The nodes A to F may hold throughput tables of the same contents, and when a change is made to a throughput table of any of the nodes, the other nodes can be notified of the change to share information.

Figure 10:
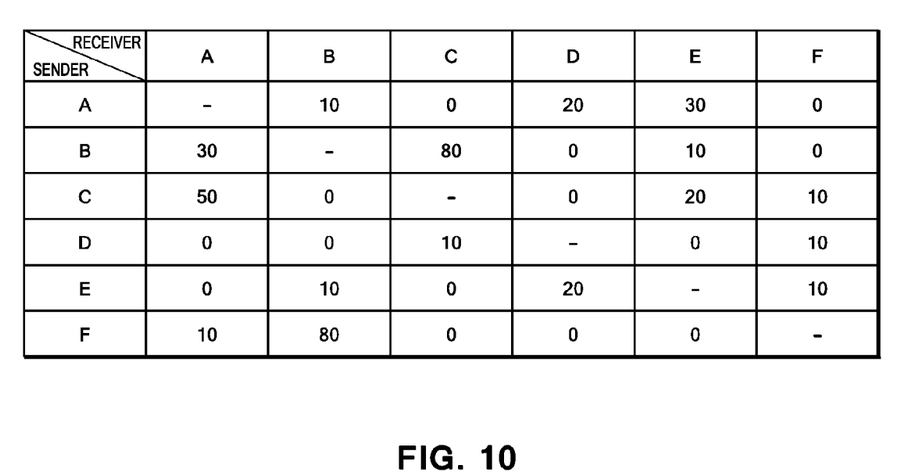
FIG. 10 is a table exemplifying a demand table in which inter-node data transfer amounts predicted from packet communication records are recorded.

Each of the nodes A to F periodically measures an inter-node data transfer amount, and records the data transfer amount as a record. The recorded record is transmitted at the time of information sharing described above, and the information is shared among all nodes. For example, a node that updates a routing table generates a demand table as shown in FIG. 10 by use of the measured values and the like of the data transfer amounts. Note that in FIG. 10, "Sender" indicates the transmission source and "Receiver" indicates the transmission destination.

A demand table includes, as set values, data transfer amounts predicted from the latest measured values and the like, and is used, together with the above throughput table, to generate a routing table and an assignment table.

Figure 11:
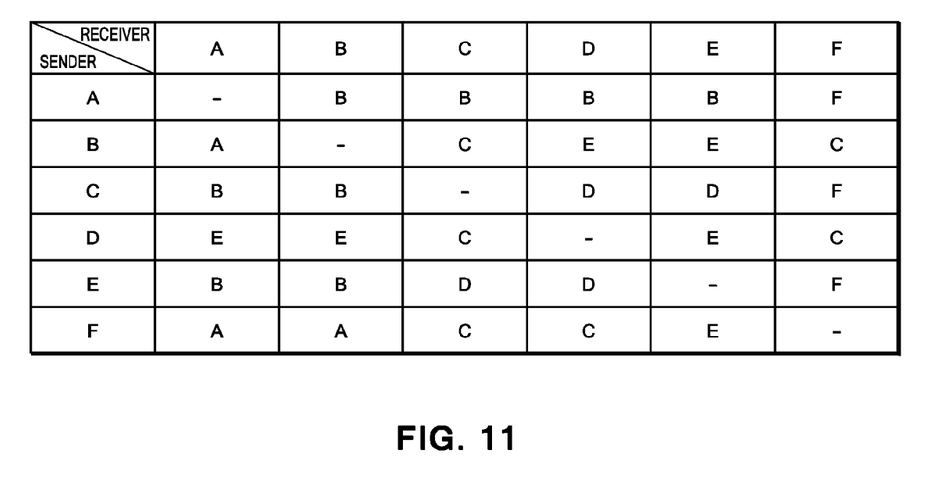
FIG. 11 is a table exemplifying a routing table generated on the basis of the throughput table shown in FIG. 9 and the demand table shown in FIG. 10.

FIG. 11 is a table showing an example of a routing table generated by use of the tables shown in FIGS. 9 and 10. For example, in packet communication where node A shown in FIG. 8 is the sender and node B is the receiver, a packet can be transmitted without passing through another node, and thus node B is set as the destination. Thus, in nodes which can directly transmit and receive packets to and from each other, any of the nodes is set as the destination.

Meanwhile, in packet communication where node A is the sender and node C is the receiver, a packet cannot be transmitted without passing through node B or node F. Accordingly, optimization is performed by use of the information in the tables shown in FIGS. 9 and 10 and a known algorithm, to thereby determine the destination.

In the above example, as a result of the optimization, it is determined to be more efficient to transmit the packet through node B. Hence, when a packet is to be transmitted from the source node A to the destination node C, routing is performed so that node A firstly transmits the packet to node B, and then node B transmits the packet to node C.

Figure 12:
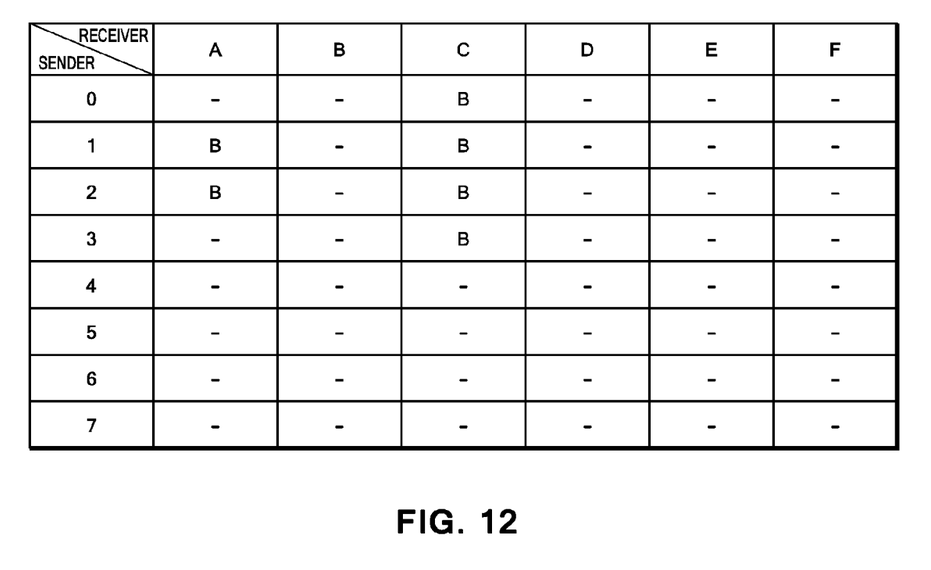
FIG. 12 is a table exemplifying an allocation table.

FIG. 12 is a table showing an example of an assignment table. In FIG. 12, eight time sections of slots 0 to 7 having equal lengths are provided, in which the receiver node A can receive packets from node B in slots 1 and 2, and the receiver node C can receive packets from node B in slots 0 to 3.

By thus avoiding a collision in terms of time as well, packets can be transmitted and received exclusively in time and space.

Figure 13:
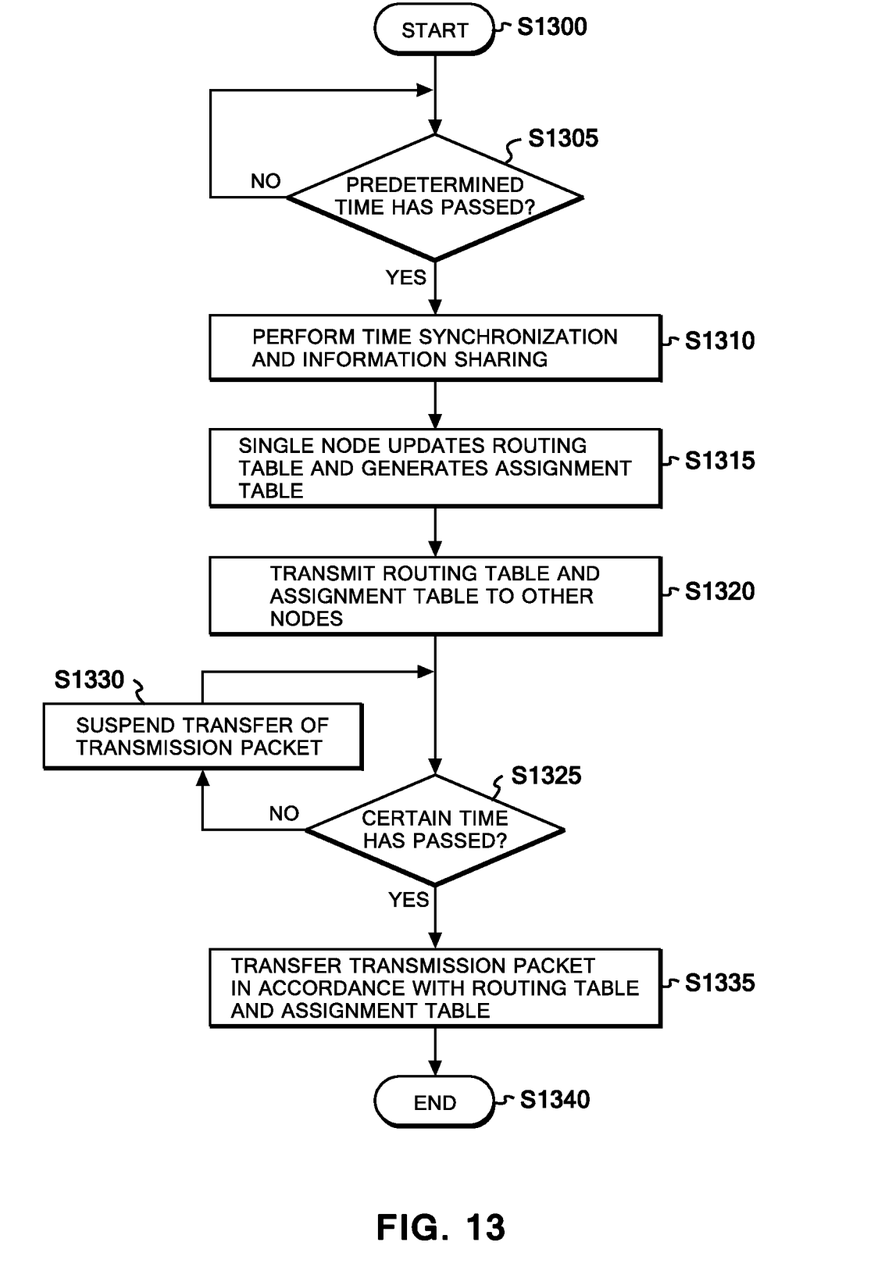
FIG. 13 is a flowchart showing a flow of packet transfer processing.

Hereinbelow, a flow of processing in the packet communication system of an embodiment of the invention will be described briefly with reference to FIG. 13. After the processing starts in step S1300, in step S1305, it is determined whether a predetermined time has passed since the last time the time synchronization and information sharing have been initiated. If not, the determination in step S1305 is made after the predetermined time further elapses.

On the other hand, if it is determined that the predetermined time has passed, the processing proceeds to step S1310 and the time synchronization and information sharing shown in FIG. 7 are performed. Then, the processing proceeds to step S1315, in which a predetermined node updates a routing table in accordance with a packet communication record acquired by information sharing, the packet communication record including the aforementioned transfer rate and data transfer amount. The predetermined node further generates an assignment table by assigning to the nodes, packet transmittable and receivable slots.

In step S1320, the predetermined node transmits the routing table and the assignment table to all of the other nodes to share the tables.

Subsequently in step S1325, it is determined whether a predetermined time has passed. If not, the processing proceeds to step S1330 in which transfer of the packet is suspended. After the predetermined time passes, the processing proceeds to step S1335. Here, if there is a transmission packet in an arbitrary node, the updated routing table is used to transfer the packet to the destination address in a slot specified in the assignment table, and the processing is terminated in step S1340.

The arbitrary node reads a destination address from the transmission packet, performs routing in accordance with the routing table to determine the next node, controls a phase of the radio wave toward the next node, and transmits the packet in the transmittable time frame. This next node performs the same processing, and the processing is repeated until the packet is transferred to the destination address.

Since nodes can be controlled to dynamically construct communication paths, the system of the present embodiment of the invention can be provided as a cross bar switch in which switches are provided at respective intersections between multiple communication paths arranged in parallel in the vertical direction and multiple communication paths arranged in parallel in the horizontal direction. The cross bar switch can be applied to a millimeter wave server system or the like to achieve a hubless or cableless computing environment. Consequently, server installation cost can be reduced, and data can be downloaded instantaneously.

The packet communication system of the present embodiment of the invention is not limited to that configured only of multiple wireless nodes performing radio communication, but can be configured by combining these multiple wireless nodes with multiple wired nodes mutually connected via a cable. A phase of a radio wave need not be controlled among the wired nodes, and a packet can be transmitted to a target node by specifying the destination address. Since each node holds address information of communicable nodes and channel information used in communication, and routing information is integrally managed while being updated as appropriate, the system as a whole can be optimized.

Hereinabove, the packet communication system and a communication method applied thereto have been described in detail with reference to the drawings. However, other embodiments, additions, modifications, omissions and the like can be made within the scope conceivable by those skilled in the art, and any embodiment including advantageous effects of this invention should be included within the scope of the present invention. Accordingly, although only the updating of routing information has been described above, if an address or a channel is to be changed due to traveling of a node or the like, address information or channel information can be updated likewise.

In addition, time synchronization and information sharing can be performed by forming multiple closed loops instead of a single loop, in consideration of the arrangement and number of nodes. In this case, efficiency can be improved in packet communication among nodes forming each closed loop, which enables efficient packet communication in the system as a whole.

Moreover, the communication method can be implemented as a program readable by a packet communication system, and the present invention is also capable of providing this program. Note that the program can be provided by being stored in a recording medium such as a CD-ROM, a DVD-ROM, an SD card and an HDD.

What is claimed is:

1. A packet communication system for transferring a packet to a destination address, the system comprising:
a plurality of nodes performing radio communication, wherein each of the said nodes:
stores therein routing information for determining a transmission path of said packet,
transmits and receives said packets to a transfer destination node and from a transfer source node on a transmission path determined by use of said routing information, through transmission and reception radio waves each of which is given a certain directivity by controlling a phase of said radio wave, and
has a function of performing a cut-through transmission in which transfer of said packet to said transfer destination node is initiated after reading of a destination address included in said packet and before reception of said packet is completed, and
wherein said packet communication system:
performs time synchronization and transmission and reception of packet communication records during a certain time period by carrying out said cut-through transmission, while controlling said phases of said transmission and reception radio waves so that all of the said nodes form one or more closed loops, and transfers said packet to said destination address at a time other than said certain time period in accordance with said routing information and a time frame assigned to each of the said nodes as a time when each said node is allowed to transmit and receive a packet, updates said routing information held by each said node on the basis of said packet communication records, and shares said updated routing information among said nodes after said time synchronization;
wherein:
said node comprises an antenna formed of a plurality of antenna elements arranged in a certain order, phase control means for controlling said phases of said transmission and reception radio waves of each of the said antenna elements, and transmission and reception means for transmitting and receiving said packet through said transmission and reception radio waves, and
said phase control means converts said destination address included in said packet into a phase difference of a radio wave to be applied to each of the said antenna elements included in said transfer destination node.

2. The packet communication system according to claim 1, wherein:
said node comprises an antenna formed of a plurality of antenna elements arranged in a certain order, phase control means for controlling said phases of said transmission and reception radio waves of each of the said antenna elements, and transmission and reception means for transmitting and receiving said packet through said transmission and reception radio waves, and
said phase control means, after reading said destination address included in said packet and before reception of said packet is completed, converts said destination address included in said packet into a phase difference of a radio wave to be applied to each of the said antenna elements included in said transfer destination node.

3. The packet communication system according to claim 1, wherein said time synchronization and said transmission and reception of said packet communication records are performed at predetermined intervals.

4. The packet communication system according to claim 1, wherein said time synchronization and said transmission and reception of said packet communication records are initiated by transferring an initiation request made by one of the said plurality of nodes among said other nodes sequentially from one to another.

5. The packet communication system according to claim 1, wherein said packet communication records each include a transfer rate and a data transfer amount between said nodes.

6. The packet communication system according to claim 1, wherein each of the said nodes further stores therein address information of communicable nodes and channel information used for communication.

7. The packet communication system according to claim 1, wherein said packet communication system comprises a plurality of wireless nodes performing said radio communication and a plurality of wired nodes mutually connected via a cable.

8. A communication method in a packet communication system, including a plurality of nodes performing radio communication, for transferring a packet to a destination address, the communication method comprising:
storing, in each of the said nodes, routing information for determining a transmission path of said packet;
transmitting and receiving said packets, by each of the said nodes, to a transfer destination node and from a transfer source node on a transmission path determined by use of said routing information, through transmission and reception radio waves each of which is given a certain directivity by controlling a phase of said radio wave;
performing, by each of the said nodes, a cut-through transmission in which transfer of said packet to said transfer destination node is initiated after reading of a destination address included in said packet and before reception of said packet is completed;
performing time synchronization and transmission and reception of packet communication records during a certain time period by carrying out said cut-through transmission, while controlling said phases of said transmission and reception radio waves so that all of the said nodes form one or more closed loops;
transferring said packet to said destination address at a time other than said certain time period in accordance with said routing information and a time frame assigned to each of the said nodes as a time when each said node is allowed to transmit and receive a packet;
updating said routing information held by each said node on the basis of said packet communication records; and
sharing said updated routing information among said nodes after said time synchronization;
wherein:
said node comprises an antenna formed of a plurality of antenna elements arranged in a certain order, phase control means for controlling said phases of said transmission and reception radio waves of each of the said antenna elements, and transmission and reception means for transmitting and receiving said packet through said transmission and reception radio waves, and
said phase control means converts said destination address included in said packet into a phase difference of a radio wave to be applied to each of the said antenna elements included in said transfer destination node.

9. The communication method according to claim 8, wherein performing transmission and reception of packet communication records further comprises determining whether said packet communication records have been acquired from all of the nodes.

10. The communication method according to claim 8, wherein:
said node includes an antenna formed of a plurality of antenna elements arranged in a certain order, phase control means for controlling phases of said transmission and reception radio waves of each of the said antenna elements, and transmission and reception means for transmitting and receiving said packet through said transmission and reception radio waves, and
transmitting and receiving said packets further comprises converting, by said phase control means, said destination address included in said packet into a phase difference to be applied to each of the said antenna elements included in said transfer destination node.

11. The communication method according to claim 8, wherein:
said node includes an antenna formed of a plurality of antenna elements arranged in a certain order, phase control means for controlling phases of said transmission and reception radio waves of each of the said antenna elements, and transmission and reception means for transmitting and receiving said packet through said transmission and reception radio waves, and
transmitting and receiving said packets, after reading said destination address included in said packet and before reception of said packet is completed, further comprises converting, by said phase control means, said destination address included in said packet into a phase difference to be applied to each of the said antenna elements included in said transfer destination node.

12. The communication method according to claim 8, wherein performing transmission and reception of packet communication records is executed at predetermined intervals.

13. The communication method according to claim 8, wherein performing transmission and reception of packet communication records further comprises initiating said time synchronization and said transmission and reception of said packet communication records by transferring an initiation request made by one of the said plurality of nodes, among said other nodes sequentially from one to another.

14. The packet communication system according to claim 8, wherein said packet communication records each include a transfer rate and a data transfer amount between said nodes.

15. The packet communication system according to claim 8, wherein each of the said nodes further stores therein address information of communicable nodes and channel information used for communication.

16. A computer program product for executing a communication method for transferring a packet to a destination address, the program being readable by a packet communication system including a plurality of nodes performing radio communication, the computer program product comprising:
   a non-transitory computer readable storage medium having computer readable program code embodied therewith, the computer readable program code comprising:
   computer readable program code configured to:
   store in each of the said nodes routing information for determining a transmission path of a packet;
   transmit and receive packets to and from a transfer destination and a transfer source node on the transmission path determined by use of said routing information, said transmission and reception being performed by controlling phases of transmission and reception radio waves and giving the radio waves a certain directivity;
   perform cut-through transmission in each of the said nodes in which transfer of said packet to said transfer destination node is initiated after reading a destination address included in said packet and before reception of said packet is completed;
   perform time synchronization and transmission and reception of packet communication records during a certain time period by carrying out said cut-through transmission, while controlling said phases of said transmission and reception radio waves so that all of the said nodes form one or more closed loops; and
   transfer said packet to said destination address at a time other than said certain time period in accordance with said routing information and a time frame assigned to each of the said nodes as a time when each said node is allowed to transmit and receive a packet, update said routing information held by each said node on the basis of said packet communication records and share said updated routing information among said nodes after said time synchronization;
   wherein:
   said node comprises an antenna formed of a plurality of antenna elements arranged in a certain order, phase control means for controlling said phases of said transmission and reception radio waves of each of the said antenna elements, and transmission and reception means for transmitting and receiving said packet through said transmission and reception radio waves, and
   said phase control means converts said destination address included in said packet into a phase difference of a radio wave to be applied to each of the said antenna elements included in said transfer destination node.

17. The computer program product according to claim 16, wherein performing transmission and reception of packet communication records further comprises said packet communication system determining whether said packet communication records have been acquired from all of the said nodes.

18. The computer program product according to claim 16, wherein:
   said node includes an antenna formed of a plurality of antenna elements arranged in a certain order, phase control means for controlling phases of said transmission and reception radio waves of each of the said antenna elements, and transmission and reception means for transmitting and receiving said packet through said transmission and reception radio waves, and
   transmitting and receiving said packets further comprises said packet communication system converting, by said phase control means, said destination address included in said packet into a phase difference to be applied to each of the said antenna elements included in said transfer destination node.

19. The computer program product according to claim 16, wherein:
   said node includes an antenna formed of a plurality of antenna elements arranged in a certain order, phase control means for controlling phases of said transmission and reception radio waves of each of the said antenna elements, and transmission and reception means for transmitting and receiving said packet through said transmission and reception radio waves, and
   transmitting and receiving said packets, after said phase control means reads said destination address included in said packet and before reception of said packet is completed, further comprises said packet communication system converting, by said phase control means, said destination address included in said packet into a phase difference to be applied to each of the said antenna elements included in said transfer destination node.

20. The computer program product according to claim 16, wherein performing transmission and reception of packet communication records is executed at predetermined intervals.

21. The computer program product according to claim 16, wherein performing transmission and reception of packet communication records further comprises said packet communication system initiating said time synchronization and said transmission and reception of said packet communication records by transferring an initiation request made by one of the said plurality of nodes, among said other nodes sequentially from one to another.

* * * * *